United States Patent [19]
Curington et al.

[11] 3,948,588
[45] Apr. 6, 1976

[54] SWIVEL FOR CORE DRILLING

[75] Inventors: Alfred R. Curington; Theodore J. Roscoe, Jr., both of Houston, Tex.

[73] Assignee: Bakerdrill, Inc., Spartanburg, S.C.

[22] Filed: Oct. 24, 1974

[21] Appl. No.: 517,510

Related U.S. Application Data

[62] Division of Ser. No. 392,628, Aug. 29, 1973, Pat. No. 3,871,486.

[52] U.S. Cl............. 417/405; 415/213 R; 415/206; 415/198 R
[51] Int. Cl.$^2$......................................... F04B 35/00
[58] Field of Search...... 415/79, 213 T, 144, 170 A, 415/62, 198; 417/405, 406, 407, 408, 409, 213 R; 285/272; 175/60, 215, 92

[56] References Cited
UNITED STATES PATENTS

| 708,900 | 9/1902 | Murgatroyd | 285/272 |
|---|---|---|---|
| 748,294 | 12/1903 | MacKenzie | 415/170 A |
| 1,610,454 | 12/1926 | Lawalzeck | 417/365 |
| 1,715,944 | 6/1929 | Oliver | 415/170 A |
| 2,042,499 | 6/1936 | Brady | 415/213 T |
| 3,091,183 | 5/1963 | Nahrgang | 415/213 R |
| 3,096,103 | 7/1963 | Murphy | 175/215 |
| 3,306,574 | 2/1967 | Bachl | 415/198 |

FOREIGN PATENTS OR APPLICATIONS

| 537,917 | 11/1931 | Germany | 415/62 |
|---|---|---|---|
| 202,685 | 3/1959 | Austria | 415/144 |
| 334,091 | 3/1921 | Germany | 417/405 |

*Primary Examiner*—Henry F. Raduazo
*Attorney, Agent, or Firm*—B. Kriegel

[57] ABSTRACT

A swivel, particularly useful in core drilling a bore hole, including a rotor rotatable in a stator, the rotor having a passage through which compressed air is forced to an air operated device for producing cores in the bore hole, and also having a return passage through which the cores conveyed by a portion of the compressed air flow into a core receiving chamber in the stator, a pusher or wiper in the chamber being secured to the rotor to rotate therewith and move around the chamber to shift the cores and core particles toward and into a stator outlet.

4 Claims, 20 Drawing Figures

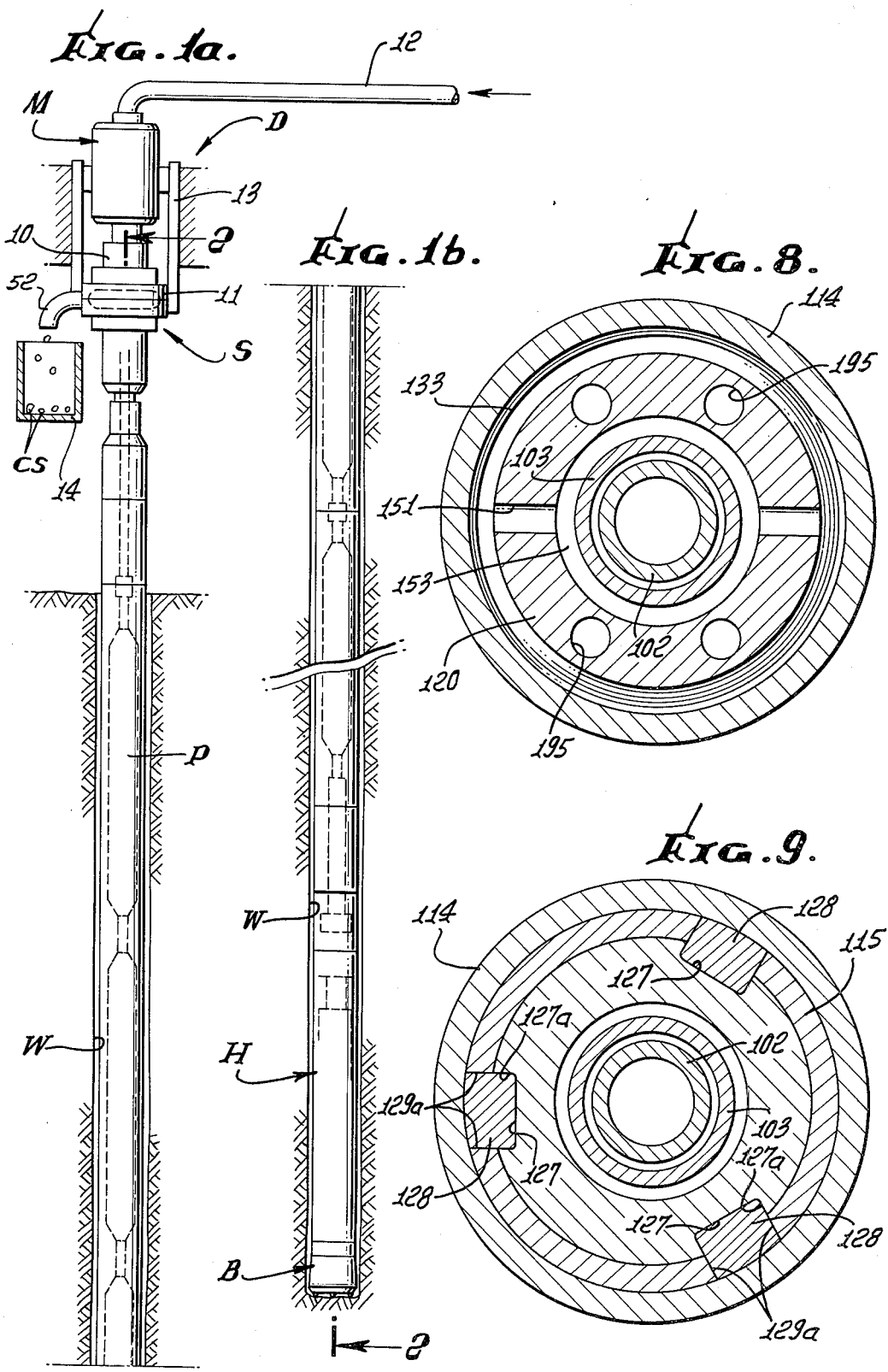

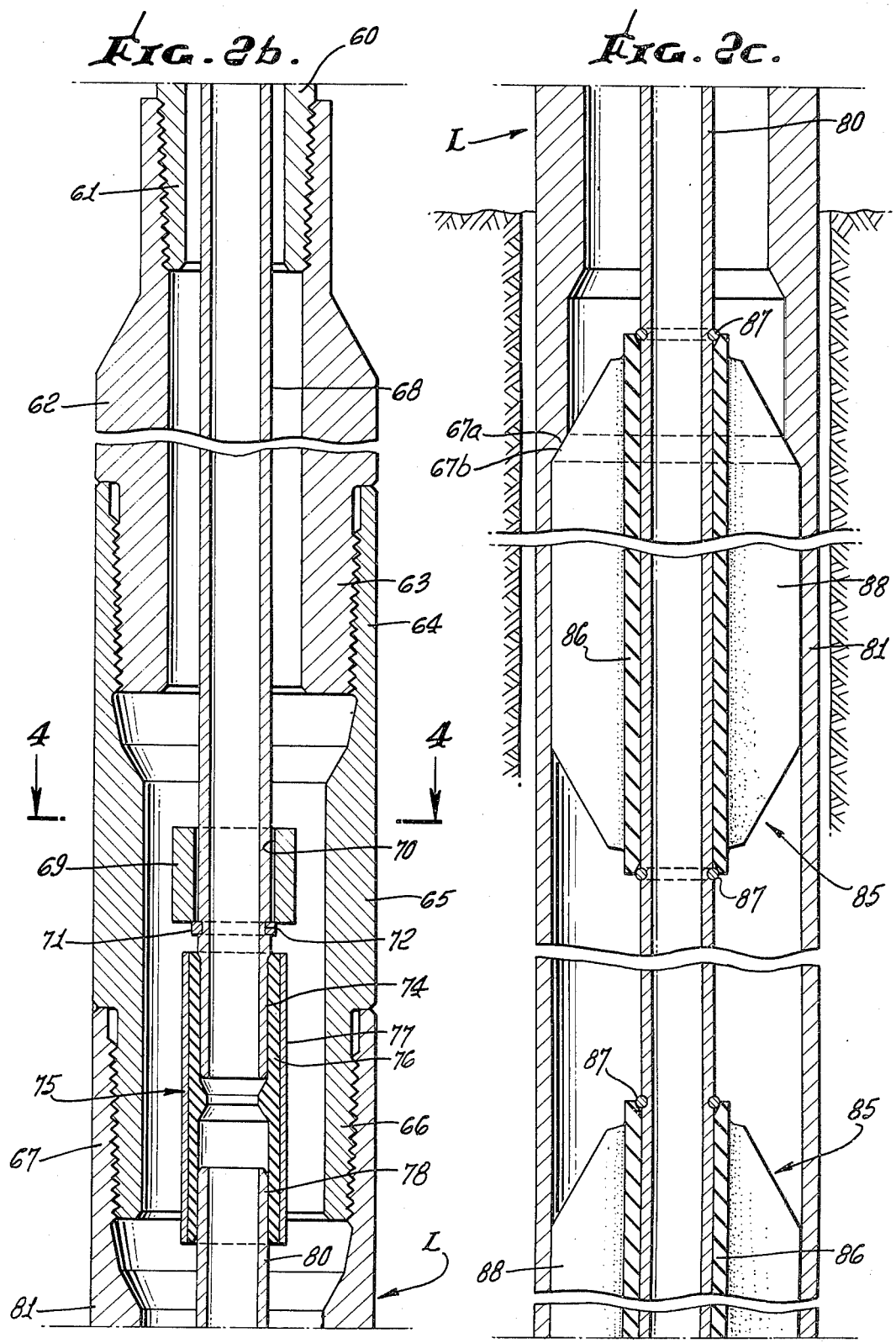

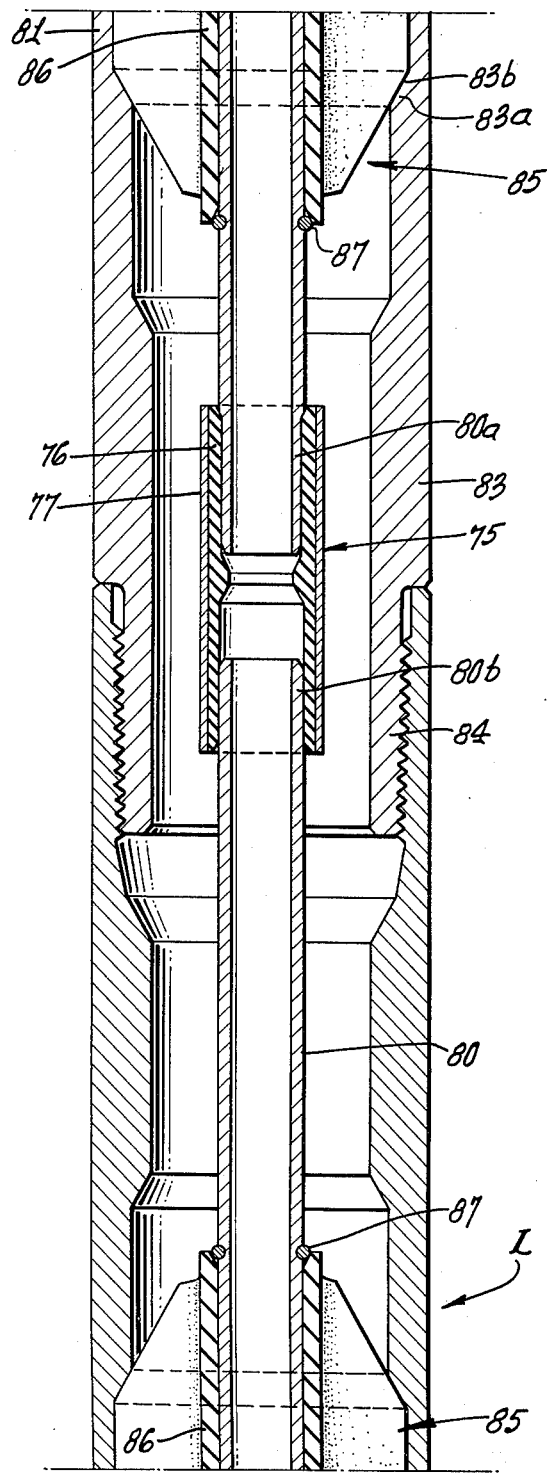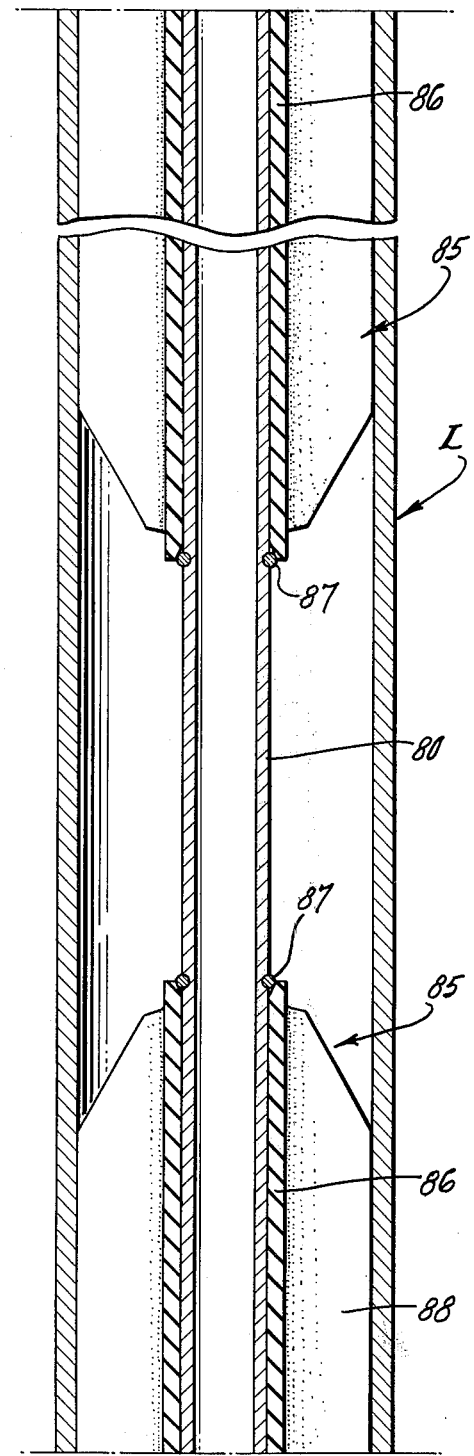

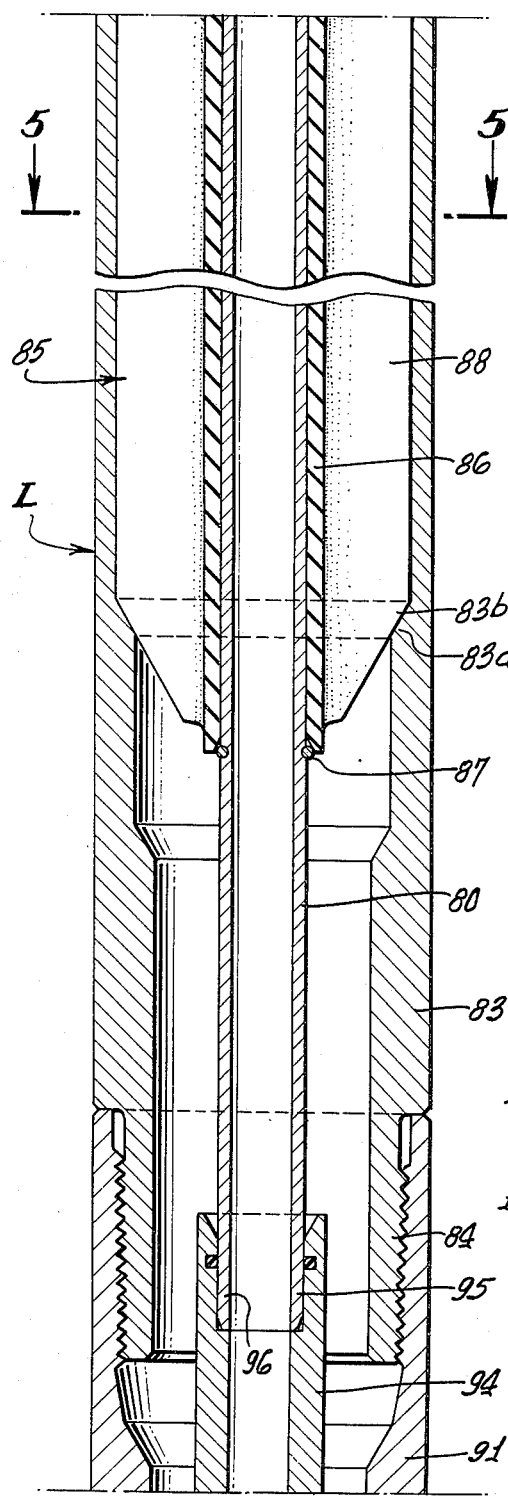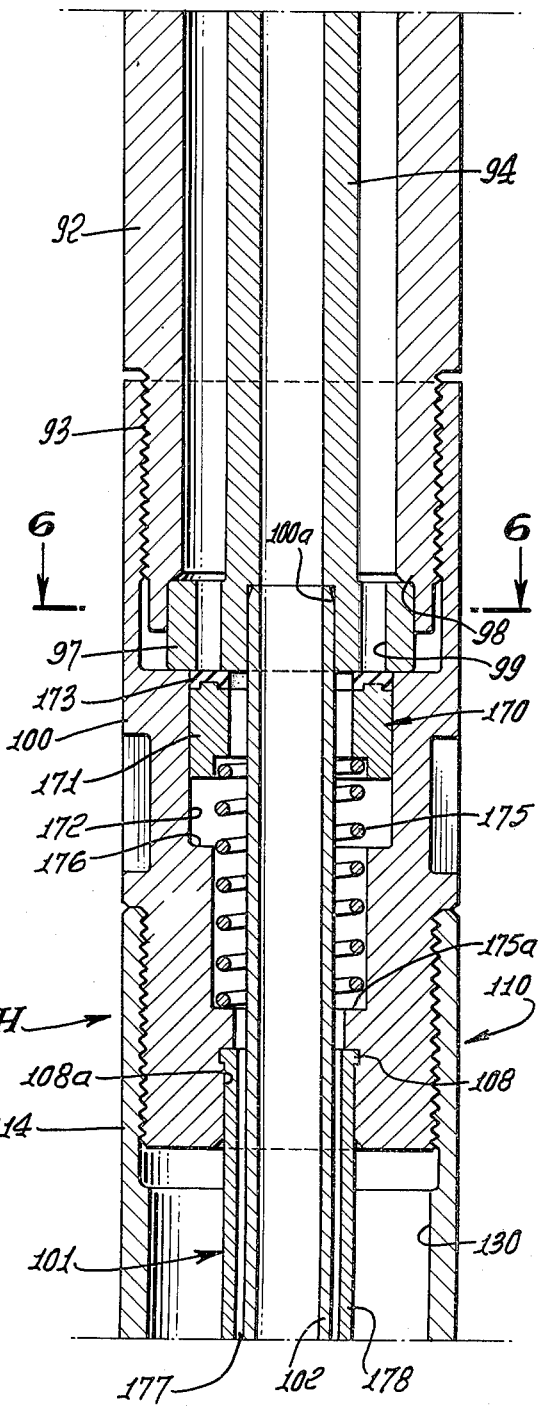

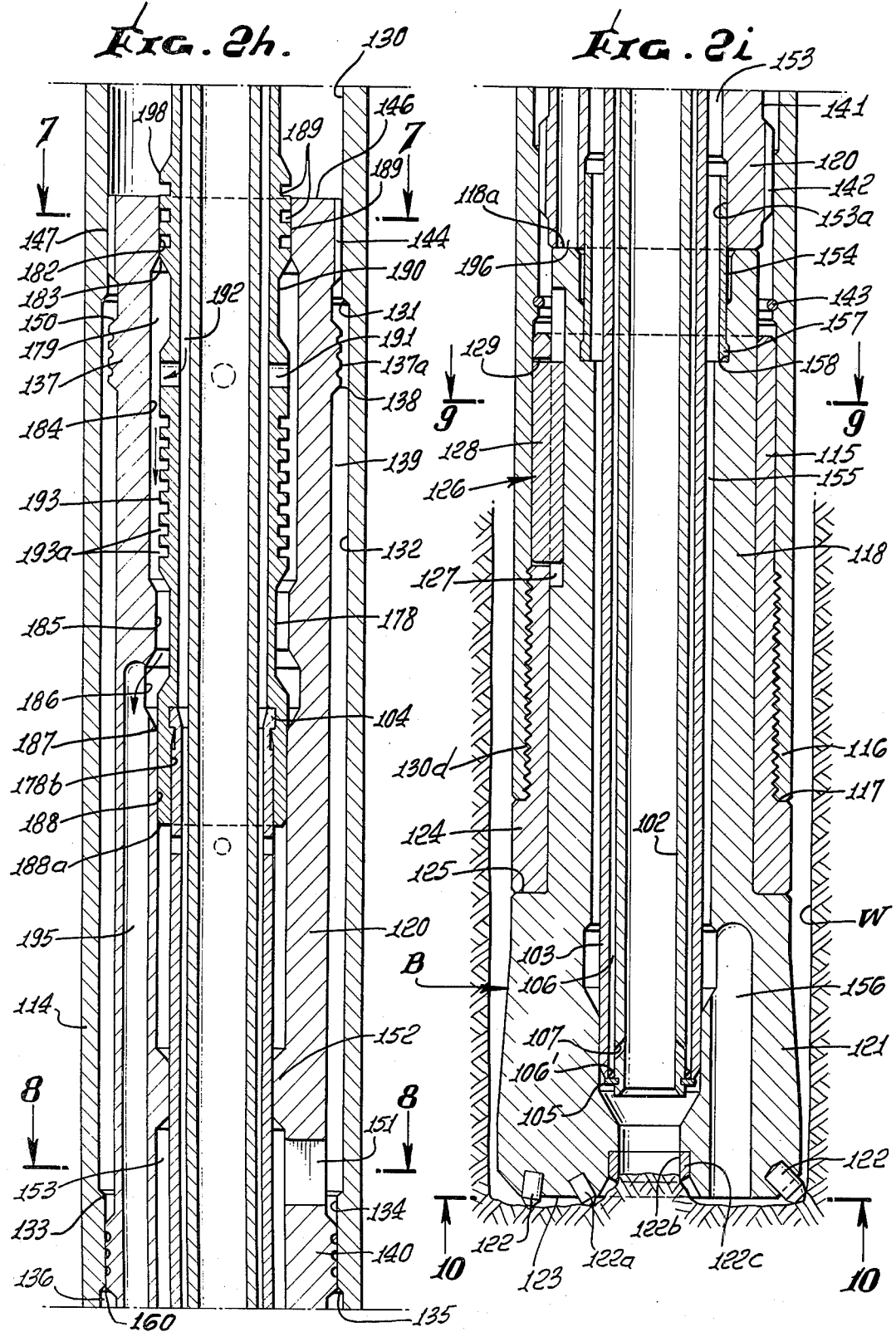

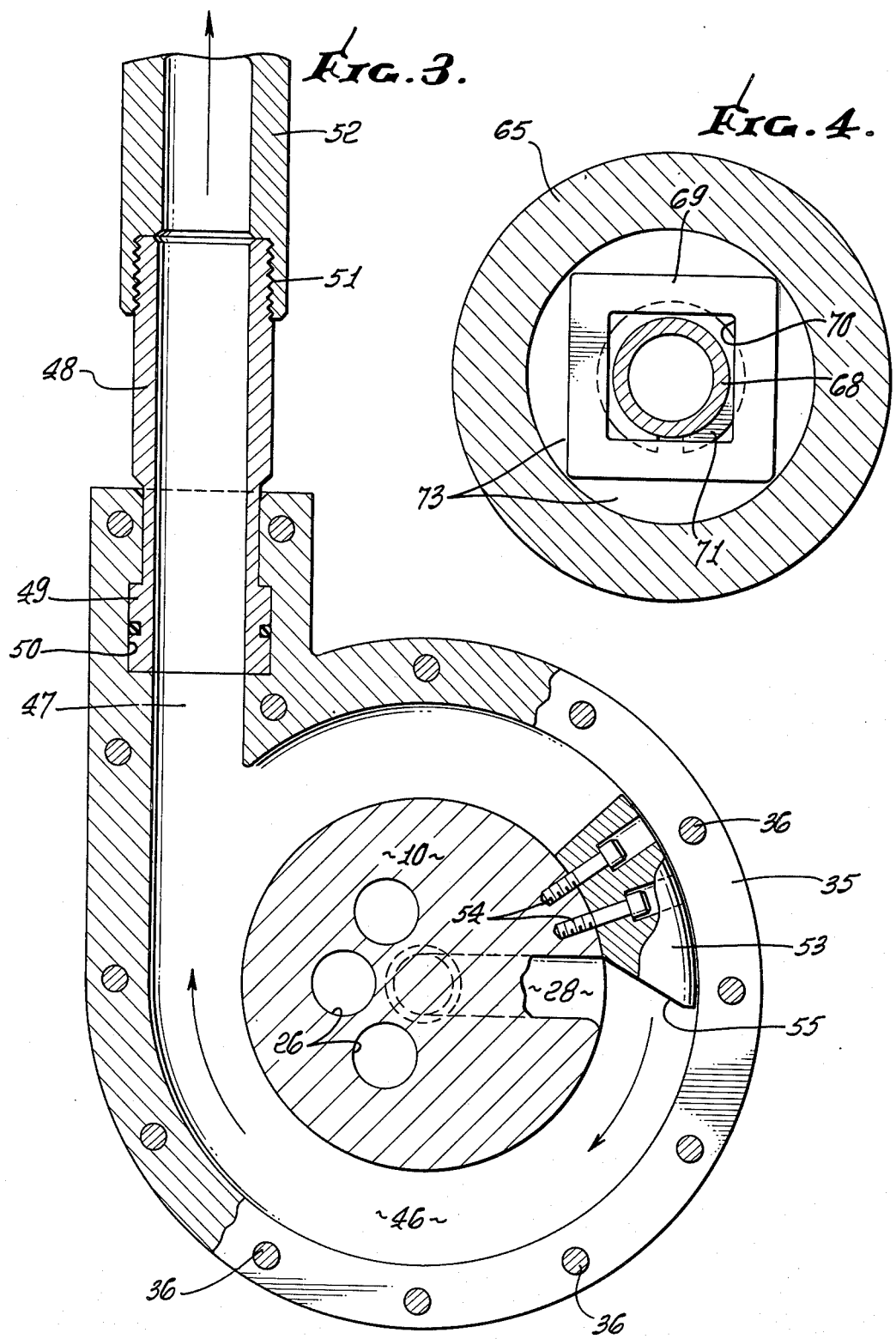

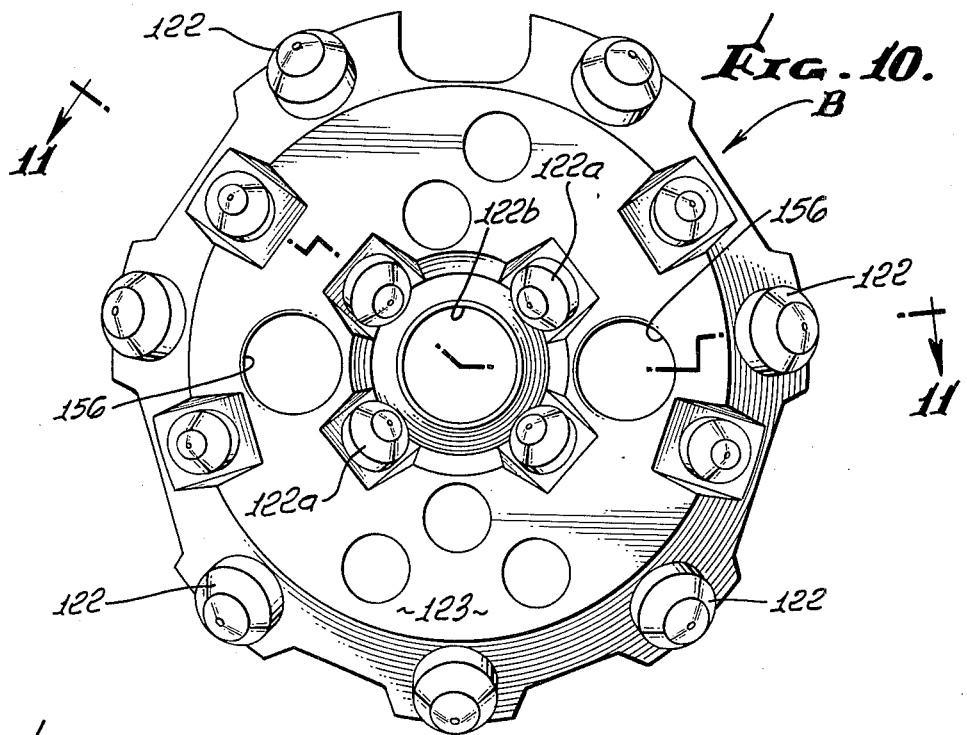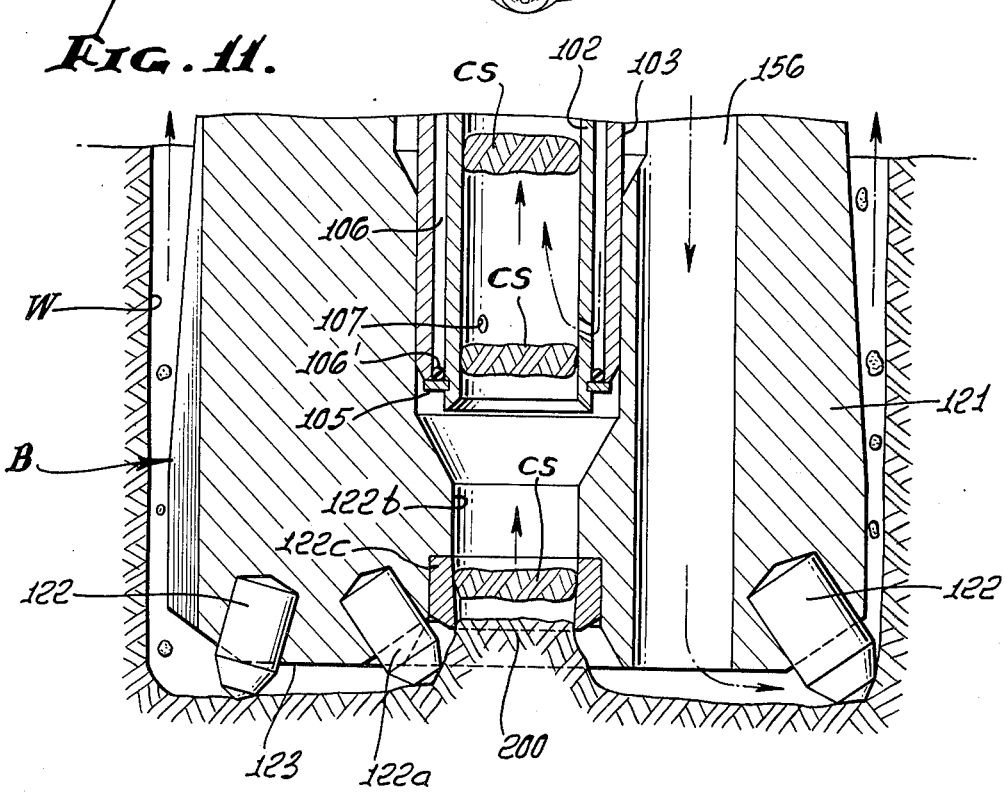

SWIVEL FOR CORE DRILLING

This is a division of application Ser. No. 392,628 filed Aug. 29, 1973 now U.S. Pat. No. 3,871,486.

In the drilling of bore holes into the earth, it is desirable to have samples of the formation being drilled on a continuous basis, so that the formation samples may be examined for various purposes, as the drilling progresses.

Heretofore, efforts to continuously take a core sample from the bottom of the bore hole, while drilling with mud, have resulted in reduced drilling efficiency and problems of cuttings removal. Dual concentric drill pipes have been utilized to conduct the drilling fluid from the surface to the drill bit in the drill pipe annulus, the fluid returning through the inner drill pipe to carry core samples to the top of the bore holes. However, inefficient cuttings removal in the bore hole annulus may result in the drill string becoming stuck, and the core samples may also stick in the inner drill pipe, if the fluid velocity is low. In addition, the core samples have been contaminated with debris from the bore hole which may be reground. In the absence of high velocity fluid carrying of the core samples, moreover, gravity separation of sample particles of different size or weight precludes the samples recovered at the top of the bore hole from being representative of the formation at any given time. Such problems are even greater when drilling with air and a percussion bit.

The present invention provides a novel system and apparatus for more efficiently drilling a bore hole while continuously taking core samples, using an airhammer and percussion bit.

More particularly, the present invention provides a novel system and apparatus whereby the core samples are taken at the center of the bottom of the bore hole and are protected against contamination by side wall material. The drilling fluid velocity which carries the core samples to the top of the bore hole is high, so as to minimize gravity separation of the core sample particles of different weight or size, so that the samples are representative of the formation at any given time during drilling. In addition, the drilling fluid which carries the other cuttings to the surface is of sufficient volume and velocity as to prevent fall out and regrinding of material at the bottom of the bore hole.

The entire system of the invention consists of a continuous coring adaptor swivel assembly, a continuous coring airhammer drill, completely integrable with any existing top drive or table drive rig for drilling bore holes, employing a rotatable drill pipe and air as the flushing fluid.

In its basic operation, compressed air is moved through the continuous coring adaptor swivel, down the annulus of the double-walled continuous coring drill pipe, to the coring airhammer. In the hammer, the compressed air is divided in such a way as to allow the major part, say approximately 90%, of the energy derived from the air flow, to properly run the coring tool. This air is exhausted from the tool at the bit face and allowed to return to the surface in the outer bore hole annulus carrying a major portion of the cuttings as in conventional airhammer drilling processes. The remainder of the air is diverted through the hammer and enters the core receiving tube just above the bit face at high pressure and velocity. Formation cores and smaller chips are picked up by the air in the core tube and carried through the inner tube to the adaptor swivel at the surface where the core samples are removed and collected in any suitable fashion, such as a vortex type separator.

The continuous coring adaptor swivel of the invention, is adapted for application to any existing top drive or table drive rotary drilling rig. When in place, the swivel offers no interference to ordinary drilling operations. In addition, the swivel affords easy access to full flow reverse circulation, at high pressure, in the event the drill string becomes stuck in the bore hole.

The continuous coring adaptor pipe or dual concentric drill pipe, is of a standard size in use on conventional rigs and all tool joints are standard, and the core tube does not interfere with conventional drilling. The core tube is securely held within the outer pipe and cannot accidentally come out during handling, but the core tube is free to move longitudinally with respect to the outer pipe, as may be necessary for making up and breaking out joints of the drill pipe, say during round tripping to replace a bit. The pipe assembly is such that energy transients causing vibration in the core tube are dampened with respect to the outer pipe.

The continuous coring airhammer structure of the present system, in general, is constructed to develop high horsepower for maximum penetration. The airhammer has little chance of becoming stuck in the bore hole because the hammer provides adequate bore hole circulation, as well as adequate core sample-carrying circulation.

This invention possesses many other advantages, and has other purposes which may be made more clearly apparent from a consideration of the form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

Referring to the drawings:

FIGS. 1a and 1b, together, constitute a general illustration of a continuous coring, air drilling system according to the invention, FIG. 1b being a downward continuation of FIG. 1a;

FIGS. 2a through 2i together constitute an enlarged, vertical section, as taken on the line 2—2 of FIGS. 1a and 1b, FIGS. 2b through 2i constituting successive downward continuations of FIG. 2a;

FIG. 3 is a horizontal section through the swivel, as taken on the line 3—3 of FIG. 2a;

FIG. 4 is a horizontal section, as taken on the line 4—4 of FIG. 2b;

FIG. 8 is a horizontal section, as taken on the line 8—8 of FIG. 2h;

FIG. 9 is a horizontal section, as taken on the line 9—9 of FIG. 2i;

FIG. 10 is a horizontal section, as taken on the line 10—10 of FIG. 2i; and

FIG. 11 is an enlarged fragmentary detail in vertical section, at the lower end of the airhammer drill, as taken on the line 11—11 of FIG. 10, but showing the drilling and coring operation.

Figure 2A:
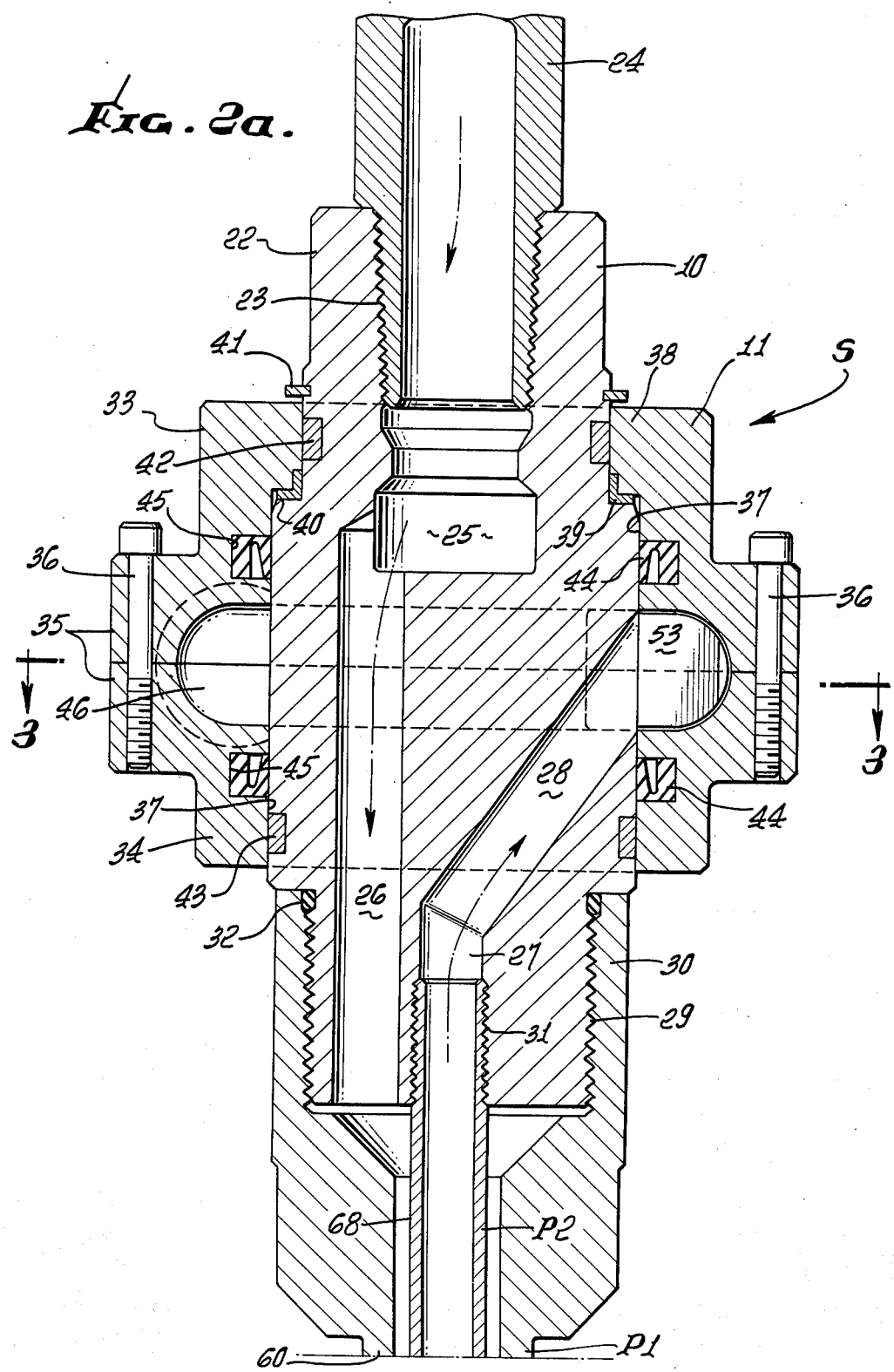

As seen in the drawings, the continuous coring system of the invention, as generally shown in FIGS. 1a and 1b, involves a coring swivel adaptor or assembly S having a rotor 10 adapted to rotate in a stator 11 by a power swivel or air motor M, to which air is supplied via a conduit 12. The stator 11 is held against rotation by means 13 in the derrick D, which allows the swivel S to move downwardly, as drilling progresses, as is well known in the case of drilling with power swivels.

Connected beneath the swivel rotor 10, for rotation therewith, is the dual concentric drill pipe P, made up of lengths or stands as the drilling progresses, and having at its lower end an airhammer assembly H for applying successive hammer blows to a core bit B, as the bit B is rotated to drill the well bore W, while taking a continuous core sample, the pieces of which are carried upwardly in the drill pipe by air supplied through the airhammer H, the other cuttings being carried in the bore hole annulus to the top of the well, as customary, by the major portion of the air supplied to the airhammer. The core sample pieces CS are discharged from the coring adaptor swivel into a suitable receiver 14.

As is well known in air drilling, the air may be supplied from a suitable compressed air source, not shown, at high volume and pressure to drive the power swivel or motor M, and thus to drive the drill pipe P, as illustrated. If desired, however, the power swivel or motor M may be eliminated and a Kelly drive may be employed to rotate the drill pipe while allowing it to progress downwardly during the drilling operation. In other words, the invention is not concerned with the manner of applying torque to the drill pipe P, but with adapting the system to cut and carry a continuous core sample to the receiver 14, utilizing the novel coring swivel adaptor S, the novel dual concentric drill pipe P, and the novel coring bit and airhammer B and H, respectively, whereby the usual cuttings are effectively removed from the well bore without contaminating the core sample, and the core sample fragments are efficiently carried to the receiver without substantial fallout or blockage of the drill pipe, the core sample being uniform and representative of the earth formation at the bottom of the bore hole at any given time during the drilling operation.

The coring adaptor swivel S is best seen in FIGS. 2a and 3. More particularly, the rotor 10 is revolvable in the stator 11 and has an internally threaded receptacle 22 for connection at 23 with the rotary driven pipe 24 which is driven by the power swivel M and which conducts air to the system from the compressed air source on the rig. The rotor 10 has an air inlet chamber 25 which communicates with a suitable number of ports or passages 26 which extend longitudinally through the rotor 10 and open at its lower end. The rotor 10 also has another passage 27 opening at its lower end and having a laterally extending branch 28 opening at the side of the rotor. At its lower end, the rotor is externally threaded at 29 to receive the internally threaded box 30 of the outer pipe P1 of the dual concentric pipe P, which will be described below, and the rotor also threadedly receives at 31 the inner pipe P2 of the dual concentric pipe P, the inner pipe P2 communicating with the port 27. A resilient seal ring 32 is disposed in the threaded joint between the pipe box 30 and the rotor 10, but a sealing joint such as that commonly employed in drill pipe tool joints may be employed.

The stator 11 is composed of a horizontally split housing having an upper part 33 and a lower part 34, having peripheral flanges 35 interconnected by fastenings 36, these body parts having a cylindrical bore 37 in which the rotor 10 is revolvable. At the upper, inner portion of the body part 33 is an inner peripheral flange 38 which rests on a bushing 39 which in turn engages an upwardly facing shoulder 40 on the rotor 10. A lock ring 41 carried by the rotor is disposed above the flange 38 to maintain the rotor assembly. Suitable bushings such as lubricated brass bushings 42 and 43 are carried between the rotor and the stator body parts to minimize friction.

At vertically spaced locations above and below the laterally opening port 28, the body sections 33 and 34 have suitable sealing ring elements or cups 44 in grooves 45 sealingly engaged with the cylindrical wall of the rotor 10 to prevent leakage between the rotor and the stator from an annular chamber 46 formed between the stator body parts 33 and 34, particularly under the high pressure of reverse circulation, when necessary to flush the well bore.

As seen in FIG. 3, the body sections 33 and 34 also provide a tangential outlet 47 for the chamber 46, and a coupling 48 has its flanged end 49 engaged in a groove 50 in the stator body when the body parts 33 and 34 are assembled. This coupling 48 is adapted to be threadedly connected at 51 to the conduit 52 through which core sample fragments CS are conducted to the receiver 14.

Adjacent to the location where the port 28 opens into the chamber 46 is a wiper or sample diverter 53 fastened to the rotor 10 by fastenings 54. This wiper conforms in profile to the chamber 46 and has an advancing face 55 angled to gently impart motion to the particles of core sample in a right-hand direction in the chamber 46 and assist the air in inducing movement of the particles to the outlet 47 with a minimum of breakage and mixing of the samples.

The continuous coring adaptor pipe or dual concentric pipe P, as indicated above, consists of the outer pipe string P1 and the inner pipe string P2. The outer pipe P1 is typical standard drill pipe and the inner pipe P2 is standard tubing, assembled in a novel manner to minimize problems of assembly, vibration, differential expansion, and the like, but enabling the lengths of pipe P to be made up and broken out in the usual manner during the drilling operations.

The dual concentric pipe string P and its interconnection with the swivel S and the airhammer H are illustrated in FIGS. 2a through 2f. As seen in FIGS. 2a and 2b, means are provided for coupling the pipe P to the swivel rotor 10 for rotation as a unit. As previously indicated, however, if the rig has a rotary table drive, a Kelly assembly would be interposed at this location to drive the pipe rotatively, in lieu of the power swivel or motor M.

The internally threaded box 30 of FIG. 2a has a downwardly extended pipe section 60 threaded at its lower end at 61 to an adaptor sub 62 which has at its lower end a typical drill pipe threaded pin 63 engaged in the threaded box 64 of a tubular coupling member 65 which, in turn, has at its lower end a typical threaded pin 66 at the upper end of a typical length L of the dual concentric drill pipe or continuous coring adaptor pipe. The inner pipe P2 of FIGS. 2a and 2b includes a length of adaptor tubing 68 threaded at 31 with the swivel rotor 10 and extending downwardly through the adaptor sub 62 and into the coupling 65. At its lower end, the adaptor tubing 68 is centralized in the coupling 65 by a suitable spider 69, formed in the illustrative embodiment, as a square body (FIG. 4) having a square opening 70 through which the tube 68 extends. The spider 69 is held against downward movement on the tube 68 by a snap ring 71 engaged in a companion groove 72 in the tube 68. The openings 73 between the spider 69 and the inside of the coupling 65 allow air to flow through the coupling 65 without substantial interference.

Below the spider 69 the tube 68 has a cylindrical lower end section 74 on which is affixed an inner pipe coupling sleeve 75 having an inner tubular body 76 of elastomeric material supported within an outer metal sleeve 77, and adapted to have a friction or slip fit at 78 with the inner tube or pipe 80 which is disposed in the box end 67 of the typical length of dual concentric pipe shown in FIGS. 2b through 2d.

Such a length of dual concentric drill pipe includes the inner tube or pipe 80 and the outer length of pipe 81. The box end 67 of the outer pipe 81 is, as customary, applied as a tool joint to the body of the pipe. At the lower end of the pipe body 81, it is provided with a typical drill pipe tool joint 83 having a threaded pin 84 engageable in the next below length of drill pipe, as customary.

Figure 5:
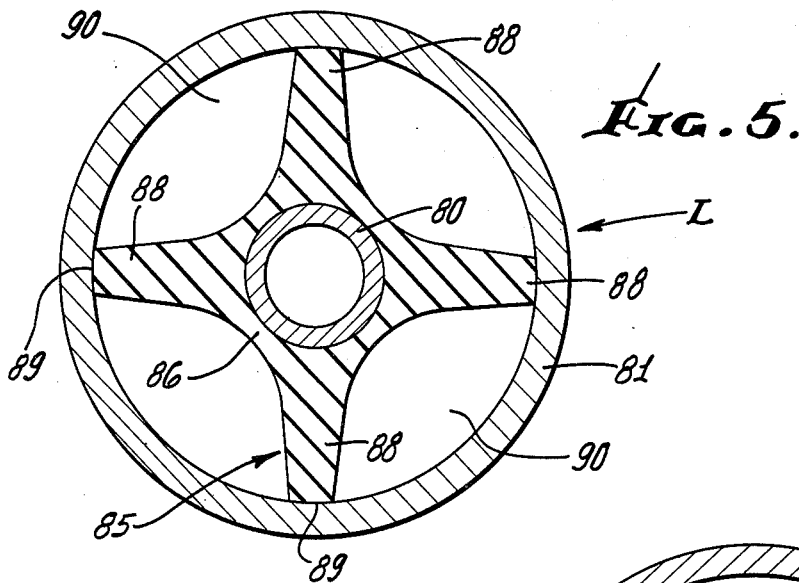
FIG. 5 is a horizontal section, as taken on the line 5—5 of FIG. 2f.

In the present case, the inner tube 80 is centralized in the outer pipe 81 and longitudinally positioned thereon by a suitable number of vibration absorbing centralizer means 85, the cross sectional configuration of which is seen in FIG. 5. Each centralizer means 85 is composed of elastomeric or rubber-like material capable of resilient deformation. It includes a central tubular body 86 frictionally engaged with the inner tube 80. Preferably, the body 86 is axially deformed between opposed stop rings 87 in companion axially spaced grooves in the tube 80, whereby the body 86 is also radially or circumferentially deformed into tight holding engagement with the tube 80 on assembly. At circumferentially spaced location about the centralizer body 86, it has longitudinally extended radiating ribs 88 frictionally engaged on the outer edge surfaces 89 within the outer pipe 81. Preferably, the diametrical dimension of the ribs 88 is greater than the inside diameter of the pipe 81 to enhance the frictional engagement and compensate for wear, the ribs being radially deformed upon assembly of the drill pipe length L. The ribs 88 afford abundant air flow spaces 90 therebetween.

In order to prevent significant relative longitudinal movement of the inner and outer pipes 80 and 81, moreover, the centralizers 85 at the upper and lower ends of the drill pipe lengths L also are adapted to resiliently position the inner pipe 80 longitudinally with respect to the outer pipe 81. As seen in FIGS. 2c and 2d, there are three centralizers 85 in the typical drill pipe length L, each constructed as above described. However, the upper tool joint 67 and the lower tool joint 83 are modified, as compared with standard tool joints, to provide downwardly and upwardly facing shoulders 67a and 83a, respectively, engaged by opposing end surfaces 67b and 83b on the ribs 88 of the upper and lower centralizers 85, preferably under compression axially of the assembly. Due to the above described friction or interference fit between the centralizers 85, the inner pipe 80 and the outer pipe 81, the pipes are interconnected so as to resist accidental separation, even after substantial wear. The resilient centralizer material dampens vibration and reduces shock loads travelling in the drill string.

A suitable number of the drill lengths L are added to the drill pipe string P, as the drilling progresses, between the coupling 65 and the uppermost pipe length L, and, except for the lowermost pipe length L, each length has, at the lower end of the inner pipe 80, as seen in FIG. 2d, one of the coupling sleeves 75 previously described affixed to the cylindrical lower pipe end 80a and adapted to telescopically engage over the upper tubular end 80b of the inner pipe 80 in the length L below. Such a resilient and telescopic connection between the inner pipes 80 not only seals the connection but compensates for tolerances and some relative longitudinal movement of the pipes 80 and 81.

Figure 6:
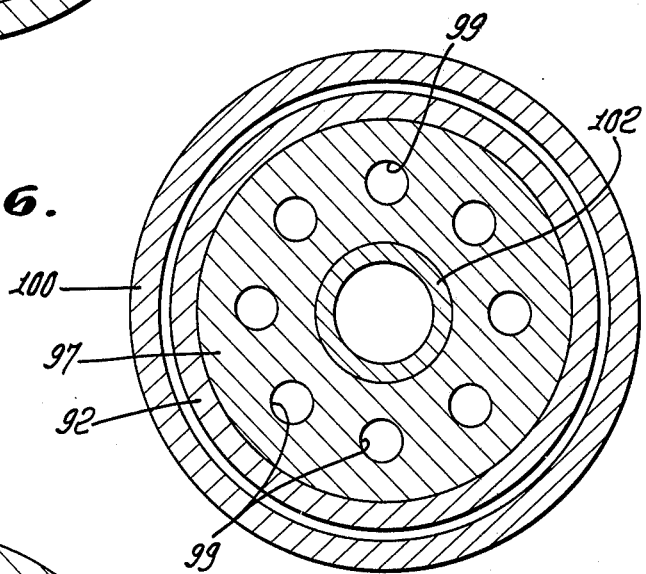
FIG. 6 is a horizontal section, as taken on the line 6—6 of FIG. 2g.

As seen in FIGS. 2f and 2g, the lowermost length of drill pipe P is connected to the novel airhammer H, hereinafter to be described. As shown, the threaded pin 84 of the tool joint 83 is threaded into the internally threaded box of a top sub 91 for the airhammer H. This top sub 91 has an outer body 92 threaded at 93 at its lower end for connection with the upper end of the airhammer H. Internally, the sub body 92 has a central tube 94 which sealingly and slidably receives at 95 the lower tubular end 96 of the pipe 80 of the above pipe length L. At its lower end the stem 94 has a circumferentially outwardly extended flange 97 held in place, when the top sub is connected to the hammer assembly H, between the latter and an internal shoulder 98 at the lower end of the body 92. This flange 97 has a number of circumferentially spaced ports 99 (FIG. 6) communicating with the annular space between the body 92 and the tube 94, which annular space communicates, in FIG. 2f, with the annular space between the outer pipe P1 and the inner pipe P2 of the drill string P, which then in turn, as seen in FIG. 2a, communicates through the swivel rotor parts 26 with the air inlet conduit 24. The tube 94 of the hammer top sub 91, on the other hand, communicates through the inner pipes 80 with the swivel rotor port 27, and thence through the stator chamber 46 of the swivel with the sample discharge port 47.

The airhammer and bit construction are illustrated in FIGS. 2g and through 2i.

More particularly, as shown in the drawings, the airhammer apparatus H is secured to the lower end of the top sub 91 by a valve body and coupling 100 by means of which the apparatus is rotated to correspondingly rotate an impact anvil bit used for drilling the bore hole W and cutting the core, the apparatus delivering repeated impact blows upon the anvil bit when compressed air is forced down the drill pipe annulus for actuating the apparatus and for cleaning the cuttings from the bottom of the hole, and carrying core sample fragments upwardly through the inner pipe 80. The apparatus is relatively simple, consisting of an elongate housing structure 110 that includes the upper connector 100 for threaded attachment to the lower end 93 of the topp sub and thus to the string of drill pipe that extends to the drilling rig at the top of the bore hole W. This connector 100 is threadedly secured to the upper portion of an elongate housing section 114, which can be of one piece, the lower end of which is threadedly secured to a lower housing head or drive member 115, the lower end 116 of the housing section bearing against an upwardly facing shoulder 117 formed on the head.

An elongate anvil portion 118 of the anvil bit B is piloted upwardly within the drive member 115, a hammer piston 120 being reciprocable in the housing section 114 above the anvil 118 to deliver repeated impact blows thereagainst. The anvil is preferably formed integrally with the drill bit portion 121 of the anvil bit, and which has suitable cutting elements 122, such as sintered carbide buttons, mounted in its drilling face 123 for impacting against the bottom of the bore hole, to produce cuttings therein, the cutting elements 122 also acting against the side of the bore hole asjacent to its bottom to insure the production of a bore hole W of the desired diameter.

As best seen in FIGS. 10 and 11, the bit also has an inner circular set of cutting elements 122a disposed in spaced relation about a central opening 122b in which is a cutter ring 122c is sintered carbide or the like, for cutting a core sample, as will be later described.

During the reciprocation of the hammer piston 120 in the housing to deliver impact blows upon the anvil bit, the drill pipe string P and housing structure 110 are rotated at a desired speed, such as 20 r.p.m., by the power swivel M or by a rotary table drive, to correspondingly rotate the anvil bit B and insure an impacting action of the cutting members 122 and 122a over substantially the entire cross-sectional area of the bottom of the hole except for the central area within the member 122a. During the impacting action, suitable drilling weight is imposed on the anvil bit through the drill pipe string P and the housing structure 110, such drilling weight being transferred from the lower end 124 of the housing head or drive member 115 to an upwardly facing shoulder 125 of the bit 121. The rotary drive itself is transferred from the housing structure 110 to the anvil 118 through a slidable spline type of connection 126, FIG. 9 and FIG. 2.

In general, the upper portion of the anvil has circumferentially spaced elongate recesses 127 in which drive segments 128 are disposed, these segments being carried in circumferentially spaced windows 129 in the drive member 115. The recesses 127 are substantially longer than the length of the segments 128, permitting relative longitudinal movement of the anvil bit B with respect to the housing structure 110. The rotary effort is transferred from the housing section 114 to the drive member 115 by virtue of the threaded connection 130d, and from the sides 129a of the openings or windows 129 to the segments 128, from where the turning effort is transmitted through the abutting segment surfaces 127a on the segments 128 to the anvil.

The housing section 114 includes an elongate, upper, inner cylindrical housing wall 130, the lower end 131 of which constitutes an upper housing flow control corner at the upper end of an elongate internal circumferential exhaust groove 132 of a larger internal diameter than the sub-jacent inner cylindrical housing wall 134, which may be of the same internal diameter as the upper housing wall 130, the upper end of the lower wall 134 providing a lower flow control corner 133. The lower end 135 of the wall 134 provides a by-pass corner at the upper end of an enlarged internal diameter circumferential by-pass groove 136.

The hammer piston 120 includes an upper piston portion 137 having an external diameter 137a conforming to the diameter of the upper inner cylindrical housing wall 130, this upper piston portion terminating a the upper end 138 of an external, reduced, circumferential exhaust groove 139. This groove 139 terminates at a lower piston portion 140 having an external diameter conforming to the internal diameter of the lower inner cylindrical housing wall 134. Below its lower piston portion 140, the hammer is of a reduced external diameter 141 to provide an air passage and the lower end has guide ribs 142 which, upon removal of the anvil bit from the housing 110, engage a limit ring 143 mounted in the housing section 114 to prevent the piston 120 from dropping from the housing structure.

Figure 7:
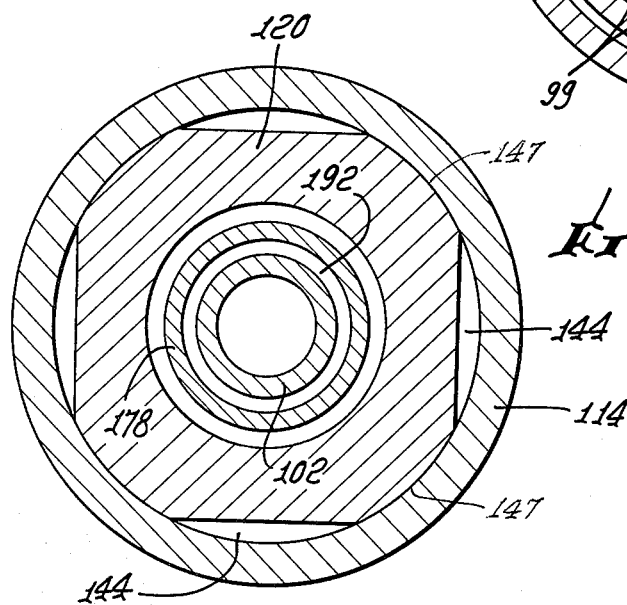
FIG. 7 is a horizontal section, as taken on the line 7—7 of FIG. 2h.

Above its upper piston portion 137, the hammer portion 120 has a plurality of relief spaces 144 (FIG. 7) extending from the upper piston portion 137 to the upper end 146 of the piston, there being spaced elongate arcuate sections 147 slidably engaging the wall 130.

When the hammer piston 120 is at the lower end of its stroke, as shown, a flow control piston corner 150 at the upper end of the piston portion 137 is spaced below the upper housing flow control corner 131, allowing air in the housing above the piston 120 to flow down through the passages 144 and into the internal circumferential exhaust groove 132, around the upper piston portion 137, then into radial exhaust ports 151 formed in the hammer piston below an intermediate annular barrier wall 152 that communicate with an elongate central piston cavity 153, into which an exhaust tube 154 extends upwardly from the anvil 118, the tube forming a continuation of the exhaust passage 153 and communicating with an annular exhaust passage 155 through the anvil and through one or a plurality of exhaust passages 156 extending downwardly through the bit 121 and opening outwardly thereof for the purpose of enabling the drilling fluid to flow into the bore hole W for removing cuttings from the bottom of the hole. The tube 154 makes a slidable seal with the wall 153a of the piston cavity 153, being secured to the anvil 118 by a lower outwardly extending flange 157 received within an inner circumferential groove 158 in the anvil. The tube may be made of an elastic material, such as Delrin, which permits it to be inserted within the anvil passage, the flange 157 contracting sufficiently until it is opposite the circumferential groove 158.

Disposed in the airhammer is a tubular core tube and air tube assembly 101, including an inner core tube 102 and an outer air tube 103. The core tube 103 extends from adjacent the lower end of the bit 121 above the central opening 122b, upwardly through the connector or valve housing 100 into a socket 100a in the latter, so as to communicate with central tube 94 in the top sub 91, and, thus, with the inner pipe 80 of the dual concentric drill pipe string P leading to the swivel S. The air tube 103 is disposed about the core tube 102 in spaced relation thereto, and has an upper end flange 104 engaged in a companion groove in a reversing valve tube 178 to be later described. Here again, the tube 103 may be of resilient material adapted to snap into engagement with the valve tube 178, when inserted into the socket 178b. The tube 103 engages within the intermediate piston wall 152. At the lower end of the core tube 102 and air tube 103, they are provided with a retainer ring 105 and seal 106 below a number of air ports 107 which extend at an angle inwardly and upwardly from the lower end of the annular space 106 between the tubes 102 and 103 into the core tube 102 just above its open, lower end adjacent to the bottom of the bit 121. At its upper end, the air tube 103 is connected to the valve tube 178, the upper end of which has a flange 108 engageable in a groove in the socket 108a in the connector and valve body 100. The structure and function of the valve tube 178, in reversing the hammer piston, will be later described.

When the piston 120 is shifted upwardly within the housing on its return stroke, the return air corner 160 at the lower end of the lower piston portion 140 will be disposed above the housing lower flow control corner 133, whereupon the compressed air below the piston can exhaust into the internal circumferential housing groove 132 and flow through the exhaust ports 151 and exhaust passages 153, 155 and 156 to the bottom of the bore hole. At this time, the upper flow control piston corner 150 will be disposed above the upper housing flow control corner 131, which will seal the upper piston portion 137 against the upper inner cylindrical housing wall 130, whereupon compressed air can drive the piston 120 downwardly on its hammer or power stroke. When the return air corner 160 moves below the housing lower flow control corner 133, the air below the piston and within the housing, which remains after the lower piston portion 140 is closed within the lower end of the cylindrical housing wall 134, is subject to compression, but such air will be at a relatively low pressure.

Compressed air for reciprocating the hammer piston 120 passes downwardly through the annulus provided in the string of drill pipe P and into the upper housing sub 92, flowing through the ports 99 past a downwardly opening check valve 170 which may be in the form of a ring 171 received within a bore 172 in the connector 100, the ring 171 having a resilient valve head 173 movable upwardly to engage beneath the flange 97 by a coiled spring 175 which seats on a shoulder 175a in the connector 100. Downward movement of the valve ring 171 is limited by its engagement with an intermediate shoulder 176 in the body 100. With air being pumped downwardly through the apparatus, the valve 170 is unseated and the air can flow between the ring 171 and the core tube 102, into the annulus 177 defined between the valve tube 178 and the core tube 102.

The inlet air under pressure is caused to flow alternately into the housing below the piston 120 and the housing above the piston, to effect reciprocation of the hammer, by the reversing valve tube 178, which separates an upper annular air chamber 179 from the lower air chamber 153.

The piston 120 has an elongate upper cylindrical surface 182 opening through its upper end 146 and terminating at an inner, flow control piston corner 183, which is the upper end portion of an elongate internal circumferential impact passage groove 184 having a larger internal diameter than the inside diameter of the upper piston portion 182. The impact passage groove 184 terminates at an intermediate inner cylindrical piston wall 185, which may have the same internal diameter as the upper cylindrical piston wall 182, the intermediate wall terminating at an internal circumferential return passage groove 186 formed in the piston and terminating at a lower flow control piston corner 187, which is the upper end of a lower internal piston seal wall portion 188 that forms a bore extending between the intermediate piston wall 152 and the corner 187. The inlet tube 178 has an upper external cylindrical sealing portion 189 having labyrinth seal grooves 189a, relatively sealingly slidable within the upper piston wall 182 and terminating in an external circumferential inlet groove 190 communicating with radial inlet ports 191 that open to the central annular inlet passage 192 between the valve tube 178 and core tube 102.

Below this inlet groove 190, the tube 178 is formed with an intermediate cylindrical sealing section 193 having labyrinth seal grooves 193a slidably and sealingly engageable with the intermediate inner cylindrical piston wall 185 and also with the lower piston wall 188.

When the piston 120 is in its lowermost operative position, with the drill bit 121 pressed against the bottom of the bore hole W, compressed air can flow downwardly through the inlet passage 192, discharging into the return passage 186 that communicates with the upper portion of one or more longitudinal return passages 195 extending downwardly through the hammer piston and opening outwardly through its lower end 196. When the hammer piston 120 moves upwardly within the housing 110 and along the inlet tube 178, the cylindrical piston wall 185 seals with the sealing section 193 of the tube 178 to interrupt communication between the inlet passage 192 and the return passages 195, continued upward movement of the piston then placing the inner flow control piston corner 183 above the upper flow control valve tube corner 198, when then allows compressed air to flow from the inlet passage 192 through the ports 191 into the circumferential inlet groove 190 and into the internal circumferential impact passage groove 184, and thence into the housing above the upper end 146 of the piston. At this time, the upper piston portion 150 will have moved partially above the upper housing flow control corner 131, so that the air under pressure between the upper end 146 of the piston and the connector 100 can act downwardly on the piston, urging it in a downward direction.

The piston 120 thus will be shifted downwardly until the upper flow control piston corner 183 moves below the flow control housing tube corner 198, which shuts off air pressure into the housing above the piston, the piston continuing to move downwardly, as the compressed air expands, until the outer upper flow control piston corner 150 moves below the upper housing flow control corner 131, which then permits air above the piston to pass through the passages 144 into the internal circumferential exhaust passage 132, and through the exhaust ports 151 and exhaust passages 153, 155 and 156 to the bottom of the hole below the drill bit, the hammer piston being driven against the upper face 118a of the anvil to deliver an impact blow to the impact bit B. As the piston 120 nears the end of its downward stroke, the cylindrical sealing wall 185 of the piston moves below the valve tube sealing section 193, thereby allowing the compressed air to flow from the inlet passage 192 into the upper piston cavity 179 and internal circumferential return passage groove 186, passing downwardly through the longitudinal return passages 195 to the lower end of the piston, such air then moving the piston in an upward direction, until the piston wall 185 passes upwardly into sealing relation to the valve tube wall 193 once again, to shut off the flow of air into the return passages 195. When this occurs, the outer upper flow control piston corner 150 moves above the upper housing flow control corner 131 to shut off the exhaust of air from the housing region above the piston 120, the compressed air below the piston expanding and driving the hammer piston upwardly toward the connector 100. Before the hammer reaches the connector 100, the inner upper flow control piston corner 183 will have shifted upwardly along the tube 178 to a position above the upper flow control housing tube corner 198, allowing air under pressure to pass from the inlet passage 192 through the impact passage grooves 190, 184 to a position in the housing above the piston 120.

The upward travel of the piston 120 is cushioned by the compression of the air remaining in the housing above the piston. However, the piston will still move upwardly sufficiently to place the lower corner 160 of the lower piston portion 140 above the housing lower flow control corner 133, which then permits the compressed air below the piston to travel into the internal circumferential exhaust groove 132 and through the exhaust ports 151 into the exhaust passages 153, 155 and 156 for discharge from the drill bit. The compressed air in the housing structure above the piston then expands to drive the piston downwardly, and the foregoing cycle of operation is repeated, the piston reciprocating to deliver repeated impact blows against the anvil portion 118 of the anvil bit B, while the drill string P is being rotated, to insure that the drilling or cutting elements 122, 122a will cover substantially the entire cross-sectional area of the bore hole bottom.

As seen in FIGS. 2i and 11, the cutters 122a are adapted to form a core 200 at the center of the bottom of the bore hole, the core being generally frusto-conical in shape. As the cutter ring 122c progresses downwardly, it will trim the core 200 and forms with the core a seal which is adapted to preclude entry of other earth particles into the core passage 122b. As drilling progresses, the upper portion of the core will break off or fragment, as indicated at CS, to produce core sample fragments which are clean and representative of the bore hole bottom, without contamination by sidewall cuttings or debris.

These core samples CS are carried upwardly through the core tube by a portion of the air being circulated to effect reciprocation of the hammer. Again, referring to FIGS. 2g through 2i, it will be noted that the annular space 106, between the core tube 102 and the air tube 103, which communicates with the ports 107 at the bottom of the core tube 102, also is in open communication with the annulus 177 between the core tube 102 and the valve tube 178. The flow restriction of the annulus 106 and the ports 107 is such, as compared with the lesser restrictions to air flow in the hammer operating system, that the major portion of the air is utilized to operate the hammer and flush cuttings upwardly in the bore hole W, and the minor portion of the air is utilized to carry the core samples upwardly in the core tube 102 and on up to the swivel chamber 46 through the inner pipe 80 of the dual concentric drill pipe, at high velocity.

The core sample fragments are carried through the drill pipe and are discharged into the swivel chamber 46, where the air and the revolving pusher 53 carry them to the outlet 47 for collection as described above.

From the foregoing, it will be apparent that the invention provides a novel and advantageous system for continuously taking a core sample while drilling with a percussion type core bit, which efficiently makes use of the available air for removing cuttings from the well bore and transporting the core sample fragments to the top of the well. The novel swivel S enables the core samples to be recovered with a minimum of damage or breakage, due to the gentle direction changes in the path of the fragments. The dual concentric drill pipe is simple in its construction, easy to assembly and facilitates utilizing typical well drilling pipe, as well as make up and break out tongs, when adding or removing lengths to and from the drill string. The novel airhammer drill, with its air dividing means and core cutting arrangement in the bit enable clean samples to be taken and carried to the surface at high velocity and uniformly without gravity separation, so that the samples are representative of the formation being drilled through at any given time.

We claim:

1. A swivel for use in core drilling a bore hole: comprising a stator having a discharge chamber extending circumferentially therearound, a rotor rotatable in said stator and having a first passage extending from its upper end to its lower end through which drilling fluid under pressure may be forced for effecting drilling of the bore hole, said rotor having a second passage extending from the lower end of said rotor to said chamber in communication with said chamber for receiving core material formed by the drilling operation and discharging the material into said chamber, the lower portion of said second passage being coaxial of said rotor, the upper portion of said second passage being inclined from said lower portion to communicate with said chamber, said rotor having inner connecting means at the lower portion of said rotor and coaxial therewith for connection with an inner pipe from which the core material discharges into said lower portion of said second passage, said rotor having outer connecting means at the lower portion of said rotor and coaxial therewith for connection with an outer drill pipe surrounding the inner pipe, whereby when an outer drill pipe is attached to said outer connecting means and an inner drill pipe is attached to said inner connecting means to form a space therebetween said drilling fluid discharges from said first passage into the space, and means at the upper portion of said rotor and coaxial therewith for connection to apparatus for rotating said rotor and the inner and outer pipes adapted to be connected thereto.

2. A swivel as defined in claim 1 said rotor having a pusher member extending into said chamber and rotatable with said rotor for displacing the material from said chamber; said chamber having an outlet through which said displaced material is discharged.

3. A swivel as defined in claim 1 said rotor having a pusher member extending into said chamber and rotatable with said rotor for displacing the material from said chamber; said chamber having an outlet through which said displaced material is discharged, said outlet being tangential of said chamber.

4. A swivel as defined in claim 1; said rotor having a pusher member extending into said chamber and rotatable with said rotor for displacing the material from said chamber; said chamber having an outlet through which said displaced material is discharged, said pusher member having an advancing face disposed non-radial of the axis of said rotor to engage the material in said chamber and direct the material circumferentially of said chamber in the direction of rotation of said rotor.

* * * * *

UNITED STATES PATENT OFFICE
CERTIFICATE OF CORRECTION

PATENT NO. : 3,948,588
DATED : April 6, 1976
INVENTOR(S) : ALFRED R. CURINGTON, ET AL It is certified that error appears in the above-identified patent and that said Letters Patent are hereby corrected as shown below:

Column 2, line 8 after "tions" and before "In" there should be a "." instead of a ","

Column 6, line 1, after the word "drill", add -- string --

Column 6, line 57, the word "topp" should be "top"

Column 7, line 8, the word "asjacent" should be "adjacent"

Column 7, line 64, the word "a" should be "at"

Column 8, line 43, the number "103", second occurence, should be "102"

Column 10, line 21, after the word "inner", add -- upper --

Column 10, line 22, the word "when" should be "which"

Column 12, line 44, claim 2, after "claim 1" add -- ; --

Column 12, line 49, claim 3, after "claim 1" add -- ; --

Signed and Sealed this

Fourteenth Day of September 1976

[SEAL]

Attest:

RUTH C. MASON
Attesting Officer

C. MARSHALL DANN
Commissioner of Patents and Trademarks